Oct. 25, 1960 C. M. FIELDS ET AL 2,957,201
EXTRUSION DIE FOR TWO-PLY SEAMLESS PLASTIC TUBING
Filed July 12, 1957 3 Sheets-Sheet 3
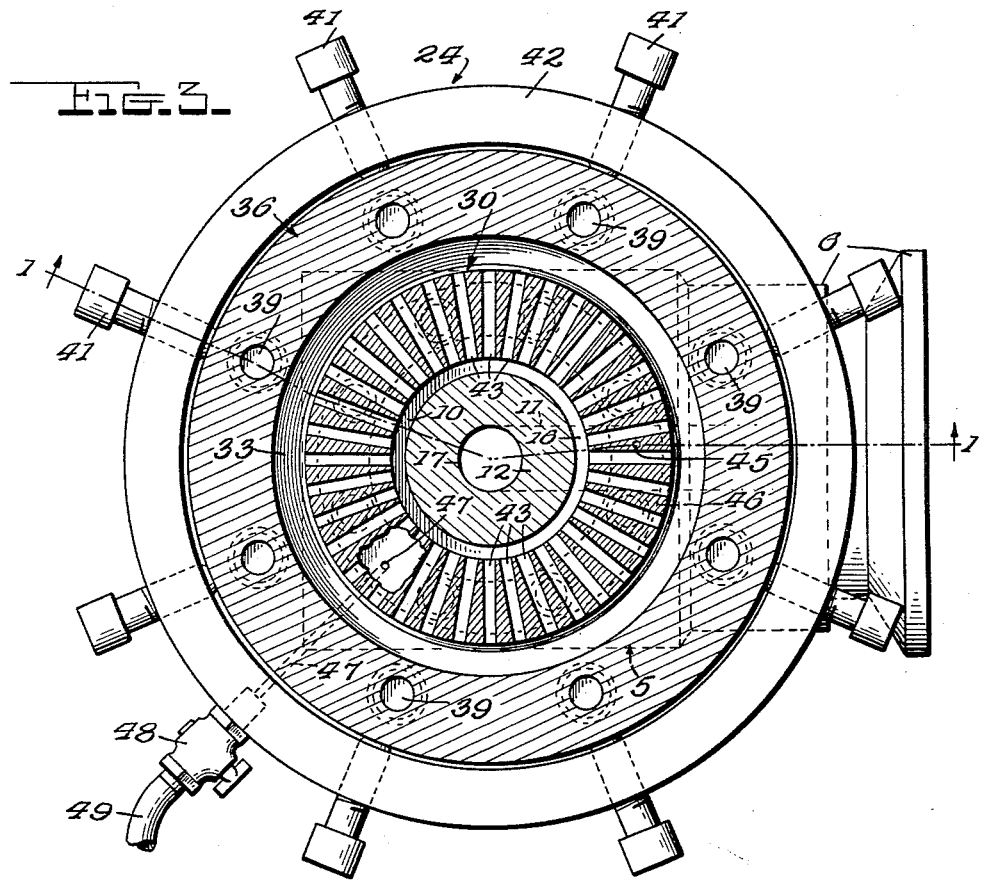
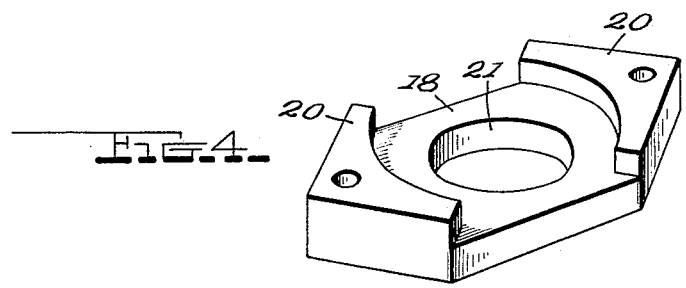
INVENTORS
Hugh K. Mallet and
Charles M. Fields
BY
ATTORNEYS

# United States Patent Office 2,957,201
Patented Oct. 25, 1960

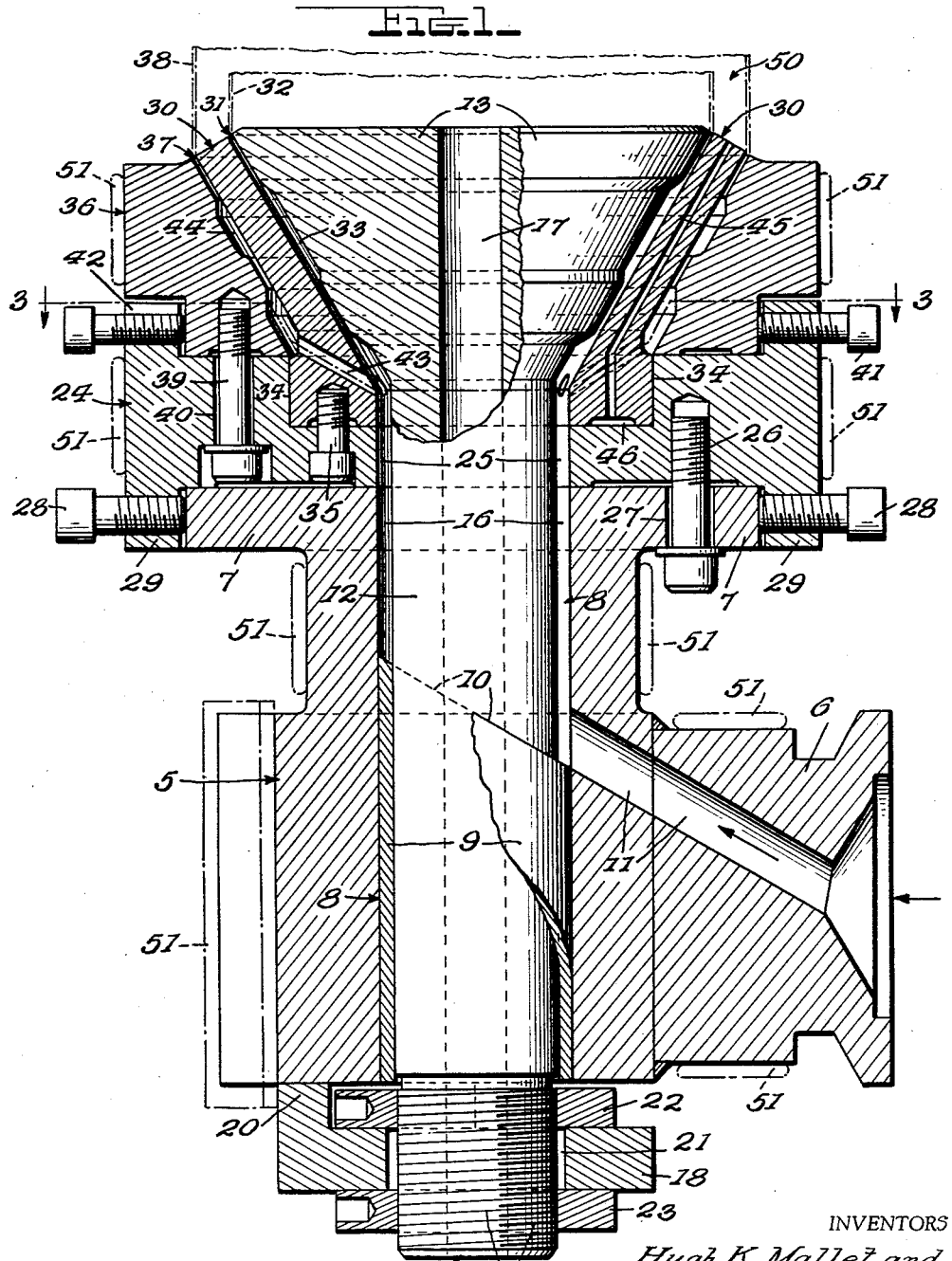

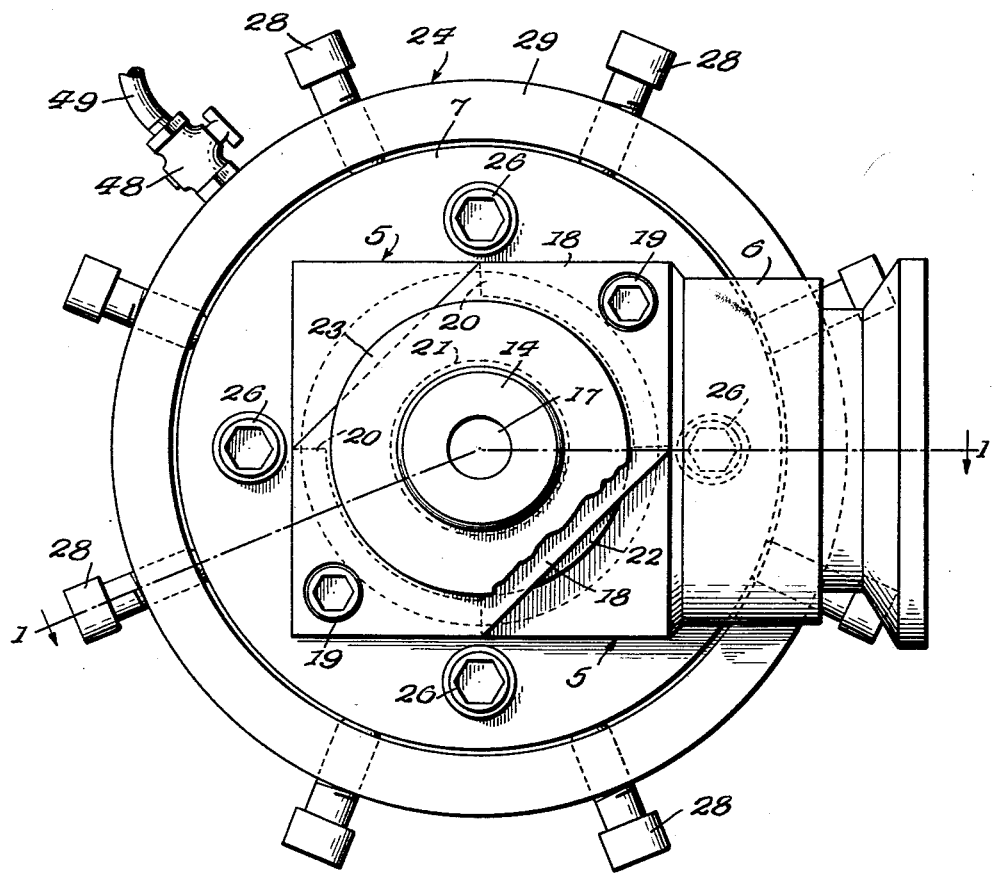

2,957,201

EXTRUSION DIE FOR TWO-PLY SEAMLESS PLASTIC TUBING

Charles Marion Fields and Hugh Kenneth Mallett, Zanesville, Ohio, assignors to Continental Can Company, Inc., New York, N.Y., a corporation of New York Filed July 12, 1957, Ser. No. 671,477

3 Claims. (Cl. 18—13)

In the manufacture of seamless plastic tubing, it is quite common to force polyethylene or other thermoplastic material through an extrusion die to shape the tubing. When so doing, however, if very thin walled tubing is being extruded, very minute pin holes frequently occur in the tubing. It has therefore been proposed to simultaneously extrude an outer tube and an inner tube in spaced concentric relation and to bring the two tubes together before appreciable setting of the plastic. The two tubes thus become integrally united into a two-ply tube and there is little likelihood of any pin holes in either tube being in register with any similar holes in the other.

Die structures proposed for such dual extrusion have been rather complicated and expensive and difficult to adjust for orifice accuracy and for producing tubing having different side wall thicknesses. The present invention, however, has aimed to provide a new and improved die structure relatively free from such disadvantages.

A head, a ring and a separator are disposed in concentric relation, with said separator between said head and ring, said separator being spaced from said head and being cooperable therewith in forming an inner continuous plastic extruding orifice, said separator being also spaced from said ring and cooperating with the same in forming an outer plastic extruding orifice.

An object of the invention has been to provide an elongated mandrel carrying the aforesaid head and disposed in a bore of the die body, the lower end of said mandrel being secured to said body and an intermediate portion of said mandrel being spaced from the wall of said bore to provide a passage for conducting the plastic to the spaces between the aforesaid separator, head and ring.

Another object has been to provide for so securing the mandrel to the die body that said mandrel may be easily adjusted longitudinally to vary the space between the mandrel head and the aforesaid separator, thus widening or narrowing the inner plastic extruding orifice according to the thickness to be imparted to the inner extruded tubing.

Still another object has been to provide a carrier adjustably mounted on the die body, to secure the aforesaid separator to said carrier for movement bodily therewith, and to adjustably mount the aforesaid ring on said carrier, the adjusting means for said carrier and ring permitting easy radial adjustment of said separator into uniformly spaced relation with the mandrel head, and correspondingly easy radial adjustment of said ring into uniformly spaced relation with said separator.

Yet another object has been to provide a novel structure in which the aforesaid separator is formed with radial ports which place the space between said separator and the mandrel head in communication with the space between said separator and the aforesaid ring, whereby the plastic for both the inner and outer extruded tubes may be supplied through the above mentioned passage between the mandrel and the wall of the body bore.

A further object has been to provide the carrier with a lower downwardly projecting continuous flange surrounding the upper end of the die body, to provide said carrier with an upper upwardly projecting continuous flange surrounding the lower portion of the aforesaid ring, to equip said lower flange with radial adjusting screws abutting said body for adjusting said carrier, to equip said upper flange with other radial adjusting screws abutting said ring for adjusting this ring, to provide clamping screws for securing said carrier to said body after carrier adjustment, and to provide other clamping screws for securing said ring to said carrier after ring adjustment, all of said clamping screws having clearances permitting the required carrier and ring adjustments when these screws are slightly loosened.

A still further object is to provide a novel construction having maximum advantages from both the standpoint of manufacture and use.

With the above and other objects in view that will hereinafter appear, the nature of the invention will be more clearly understood by reference to the following detailed description, the appended claims and the several views illustrated in the accompanying drawings.

In the drawings:

Figure 1 is a view partly in elevation but primarily in vertical section substantially on the lines 1—1 of Figures 2 and 3.

Figure 2 is a lower end view.

Figure 3 is a horizontal sectional view on line 3—3 of Figure 1.

Figure 4 is a perspective view of a plate embodied in the means for adjusting and securing the mandrel.

The preferred construction has been illustrated and will be specifically described but attention is invited to the possibility of making variations.

The die body 5 is provided with a lateral boss 6 for attachment to a conventional extruding machine. The upper end of this body 5 is formed with an annular outwardly projecting flange 7, the upper side of said flange and the upper end surface of said body being disposed in the same horizontal plane. A cylindrical bore 8 is formed vertically through the body 5 and opens through both the upper and lower ends of said body, said bore being concentric with the flange 7. A bushing 9 is tightly secured in the lower portion of the bore 8 and has its upper end surface 10 disposed in an inclined plane, with the lowest portion of said surface 10 positioned toward the boss 6. A port 11 extends through the body 5 and boss 6 and opens into the bore 8 directly over the aforesaid lowest portion of the bushing end surface 10.

A cylindrical mandrel 12 extends longitudinally through the bore 8 and bushing 9 and contacts with the latter without appreciable clearance. The upper end of the mandrel 12 projects above the flange 7 and is shaped to form a conical head 13 having its apex disposed downwardly. The lower end 14 of the mandrel 12 projects downwardly from the body 5 and is externally threaded at 15. The intermediate portion of the mandrel 12 is spaced from the wall of the bore 8 to provide a plastic conducting passage 16 between said mandrel and said bore wall, said passage 16 being in communication with the port 11. A longitudinal duct 17 is formed in the mandrel for a purpose to be later explained.

A horizontal plate 18 is located under the body 5 and is secured to said body by screws 19, said plate 18 being provided on its upper side with integral lugs 20 which abut the lower end of said body 5 and space the body portion of said plate downwardly from said lower end of said body 5. This body portion of the plate 18 is formed with an opening 21 through which the threaded lower end 14 of the mandrel 12 extends without contact. An upper nut 22 and a lower nut 23 are threaded onto the mandrel end 15 and contact respectively with the upper and the lower side of the plate 18. The mandrel 12 is thus rigidly secured to the body 5, and by loosening either nut and tightening the other, said mandrel may be vertically adjusted with precision, for a purpose to be later explained.

A circular carrier 24 is disposed upon the upper end of the body 5 and its flange 7, said carrier having a central opening 25 registering with the upper end of the body bore 8 to form with the mandrel 12 a continuation of passage 16. The carrier 24 is secured to the flange 7 by clamping screws 26, said screws having clearance in the flange openings 27 to allow radial adjustments of the carrier 24 when said screws are loosened: and radial adjusting screws 28 are provided for making the adjustments. The carrier is formed with a downwardly projecting continuous flange 29 through which the adjusting screws 28 are threaded with their inner ends abutting the edge of the flange 7, which edge is surrounded by said flange 29.

By slightly loosening the clamping screws 26 and turning the adjusting screws 28, the carrier 24 may be positionally adjusted with precision. The carrier may then be locked in adjusted position by re-tightening the clamping screws 26.

An upwardly flared separator 30 is secured upon the carrier 24 for adjustment bodily with said carrier. This separator 30 surrounds and is spaced from the mandrel head 13, and these two elements 30 and 13 coact in forming an inner continuous orifice 31 through which to extrude an inner plastic tube 32. The space 33 between the separator 30 and the head 13 communicates with the opening 25 of the carrier 24. This carrier has a countersink 34 in which the lower end of the separator 30 is secured by screws 35. A ring 36 is secured upon the carrier 24 and surrounds the separator 30, said ring and separator being spaced apart and coacting in forming an outer continuous orifice 37 through which to extrude an outer plastic tube 38. The ring 36 is secured upon the carrier 24 by clamping screws 39 which have clearance in the carrier openings 40 to permit radial adjustments of the ring upon the carrier. Radial adjusting screws 41 are provided for making the adjustments, these screws 41 being threaded through an upwardly projecting continuous flange 42 which is formed on the carrier 24 and surrounds the lower portion of the ring 36, which portion is abutted by the inner ends of said screws 41.

By slightly loosening the clamping screws 39 and turning the adjusting screws 41 as required, the ring 36 may be positionally adjusted with precision. The ring may then be locked in adjusted position by re-tightening the clamping screws 39.

The screws 26 and 28 are employed to so adjust the carrier 24 on the body 5 as to dispose the separator 30 in strictly concentric relation with the mandrel head 13, thus insuring uniform radial width for the inner orifice 31 through which the inner plastic tube 32 is extruded. The width of this orifice 31 and therefore the thickness of the tube wall, may be varied as required by operating the nuts 22 and 23 to longitudinally adjust the mandrel 12 and its head 13. The screws 39 and 41 are employed to set the ring 36 in strictly concentric relation wtih the separator 30, thus insuring uniform radial width for the outer orifice 37 through which the outer plastic tube 38 is extruded, resulting in uniform thickness of the tube wall.

The lower end portion of the separator 30 is formed with a plurality of substantially radial ports 43 which connect the space 33 between said separator and the mandrel head 13 with the space 44 between said separator and the ring 36. The separator 30 also has a small vertical port 45 from its upper to its lower end; and said lower end has a shallow groove 46 with which said port 45 communicates. This groove 46 communicates with the inner end of a small radial port 47 (Figure 3) which is formed in the carrier 24. A valve 48 is connected to this carrier 24 in communication with the port 47, and a preferably flexible tube 49 is connected with said valve.

When the valve 48 is opened and sub-atmospheric pressure is created in the tube 49, preferably by human mouth suction, a corresponding sub-atmospheric pressure is produced in the space 50 between the lower ends of the extruded plastic tubes 32 and 38, to aid in bringing said tubes into integral union with each other and to prevent appreciable trapping of air between said tubes. However, as the tubes are upwardly fed and united, it has been found that a small amount of air from the space 50 is entrained with them, resulting in a very slow reduction of the sub-atmospheric pressure in said space 50, and if the pressure drop be allowed to become too great, one or both tubes will turn abruptly at the extruding orifice, contact with the end of the die and break off. Such an occurrence is avoided by periodically opening the valve 48 and restoring the desired pressure.

Air at above-atmospheric pressure may be conducted from a blower or the like through the mandrel duct 17 into the inner tube 32, to expand the latter into integral union with the outer tube 38, and if desired such air pressure may be sufficient to expand both tubes to impart a diameter to the finished tubing greater than the diameter of the outer extruding orifice 37. Expansion of both tubes to a diameter greater than that of the orifice 37 may also be effected, if desired, by passing said tubes jointly around an internal cooling ring but such a ring may be employed to merely expand the inner tube 32 into union with the outer tube, without appreciably increasing the diameter of the latter.

Contraction of both of the tubes 32 and 38 to a diameter less than that of the inner extruding orifice 31, if desired, may be effected by passing both tubes through an external cooling ring but such a ring may be used to merely contract the outer tube 38 into union with the inner tube 32, without appreciably decreasing the diameter of the latter.

Coacting nip rolls may be employed above the extrusion die to upwardly pull the tubing and to at least temporarily flatten it after union of the inner and outer tubes and cooling. Such flattening prevents escape of pressure supplied through the mandrel duct 17. The completed tubing may be wound on a reel in flattened form or may be restored to circular cross sectional shape before reeling.

To maintain the plastic at desired high temperature during its passage through the die, any suitable die heating means may be employed. Electric heaters are diagrammatically illustrated at 51 in Figure 1 by broken lines.

From the foregoing, it will be seen that a novel and advantageous construction has been disclosed for attaining the desired ends. However, attention is again invited to the possibility of making variations.

We claim:

1. An extrusion die for two-ply seamless plastic tubing comprising a body having a bore which opens through its upper end, a mandrel disposed longitudinally in said bore and having a head above said body, the intermediate portion of said mandrel below said head being spaced from the wall of said bore to provide a plastic conducting passage uniformly spaced around said intermediate portion of said mandrel, lateral passage means for conducting a plastic to said passage, means securing the lower end of said mandrel to said body, a separator surrounding and outwardly uniformly spaced from said head, said separator and head coacting in forming an inner continuous plastic extruding orifice, a ring surrounding said separator and uniformly spaced therefrom, said ring and separator being cooperable in forming an outer continuous plastic extruding orifice, and centering means mounting said separator and said ring on said body with the aforesaid passage in communication with the space between said separator and said head, said separator having radial passages extending from the lowermost portions of said space to the lowermost portion of the space between said separator and said ring at the uppermost portion of said passage, said mounting means for said separator and said ring including a carrier to which said separator and said ring are secured, and second centering means securing said carrier to said body, said means securing the lower end of said mandrel to said body including adjusting means for longitudinally adjusting said mandrel, said head and said separator having coacting surfaces effective to vary the size of said inner orifice when said mandrel is longitudinally adjusted.

2. An extrusion die for two-ply seamless tubing comprising a body having a bore which opens through its upper end, a mandrel disposed longitudinally in and projecting upwardly from said bore, the upper end of said mandrel being provided with a head, the intermediate portion of said mandrel below said head being uniformly spaced from the wall of said bore to provide a plastic conducting passage around said intermediate portion of said mandrel, lateral passage means for conducting a plastic to said passage, means securing the lower end of said mandrel to said body, a carrier resting upon the upper end of said body and having an opening registering with the upper end of said bore and forming a continuation of said passage, said carrier having a downwardly projecting flange surrounding and spaced from said upper end of said body, clamping screws securing said carrier to said body, said clamping screws having clearance permitting radial adjustments of said carrier with respect to said mandrel, radial adjusting screws threaded through said flange and abutting said body for effecting said radial adjustments of said carrier, a separator projecting upwardly from said carrier and secured thereto for radial adjustment bodily with said carrier, said separator surrounding and being uniformly spaced from said head, the space between said separator and said head being in communication with said opening of said carrier the upper ends of said separator and head being cooperable in forming an inner continuous plastic extruding orifice, a ring resting upon said carrier, said ring surrounding said separator and being spaced therefrom, additional clamping screws securing said ring upon said carrier and having clearance permitting radial adjustments of said ring with respect to said separator, and additional radial adjusting screws for effecting said radial adjustments of said ring, said carrier having a continuous upwardly projecting flange surrounding and uniformly spaced from the lower portion of said ring, said additional radial adjusting screws being threaded through this flange, said separator having radial openings from the lowermost portion of the space between said separator and said head to the lowermost portion of the space between said separator and said ring at the uppermost portion of said passage, the upper end of said separator being cooperable with said ring in forming an outer continuous plastic extruding orifice.

3. A structure as specified in claim 2, in which said means securing the lower end of said mandrel to said body includes adjusting means for longitudinally adjusting said mandrel, said head and said separator having coacting surfaces effective to vary the size of said inner orifice when said mandrel is longitudinally adjusted.

References Cited in the file of this patent

UNITED STATES PATENTS

| | | |
|---|---|---|
| 2,057,467 | Williams | Oct. 13, 1936 |
| 2,633,602 | Sverdrup | Apr. 7, 1952 |
| 2,753,596 | Bailey | July 10, 1956 |
| 2,760,230 | Van Riper | Aug. 28, 1956 |
| 2,859,476 | Lainson | Nov. 11, 1958 |